(12) United States Patent
Yu et al.

(10) Patent No.: US 8,007,947 B2
(45) Date of Patent: Aug. 30, 2011

(54) METHOD OF SELECTING NON-HUMIDIFICATION OPERATION CONDITION OF PROTON EXCHANGE MEMBRANE FUEL CELL

(75) Inventors: Hongmei Yu, Liaoning (CN); Pingwen Ming, Liaoning (CN); Baolian Yi, Liaoning (CN)

(73) Assignee: Sunrise Power Co., Ltd., Liaoning (CN)

( * ) Notice: Subject to any disclaimer, the term of this patent is extended or adjusted under 35 U.S.C. 154(b) by 722 days.

(21) Appl. No.: 12/159,247

(22) PCT Filed: Dec. 25, 2006

(86) PCT No.: PCT/CN2006/003593
§ 371 (c)(1),
(2), (4) Date: Jun. 26, 2008

(87) PCT Pub. No.: WO2007/076691
PCT Pub. Date: Jul. 12, 2007

(65) Prior Publication Data
US 2009/0004514 A1    Jan. 1, 2009

(30) Foreign Application Priority Data
Dec. 30, 2005   (CN) .......................... 2005 1 0136766

(51) Int. Cl.
*H01M 8/04*    (2006.01)

(52) U.S. Cl. .......... 429/431; 429/428; 429/430; 429/432
(58) Field of Classification Search .................. None
See application file for complete search history.

(56) References Cited

OTHER PUBLICATIONS

Yu, H., Ziegler, C., Transient behavior of a proton exchange membrane fuel cell under dry operation, Journal of the electrochemical society, 153 (3) A570-A575 (2006).*

* cited by examiner

*Primary Examiner* — Cynthia Lee
(74) *Attorney, Agent, or Firm* — Smith, Gambrell & Russell, LLP

(57) ABSTRACT

The invention relates to fuel cell non-humidification operation, specifically to—a method on dry operation condition selection, wherein under condition of inputting dry gas, applying predetermined temperature, pressure and the input flow of the dry gas and detecting the temporary current-voltage curve of the cell. The selection method of this invention can realize steady operation of the cell under non-humidification condition and avoid the dehydration problem of the membrane under the dry gas as well as the "flood" phenomena. The present invention can be applied to not only normal temperature work condition, but also the start and run of the fuel cell under zero degree temperature condition especially. It can simplify the system of the fuel cell and therefore improve the development of the fuel cell.

3 Claims, 4 Drawing Sheets

METHOD OF SELECTING NON-HUMIDIFICATION OPERATION CONDITION OF PROTON EXCHANGE MEMBRANE FUEL CELL

FIELD OF THE INVENTION

The invention relates to fuel cell non-humidification operation, specifically to a method on dry operation condition selection. Based on a voltage-current curve (I-V curve) of a fuel cell, a steady non-humidification operation condition for proton exchange membrane fuel cell could be identified via the analysis of the I-V hysteresis phenomenon, and the dry operational balanced point between the flooding and the dehydration of the proton exchange membrane.

BACKGROUND OF THE INVENTION

Fuel cells, with the function of transforming chemical energy from fuel and oxidant into electric energy directly, is not involved in the form of heat engine and thus does not restricted by the Carnot cycle. It also has high energy efficiency and be widely considered as the most potential energy-conversion devices for the 21$^{st}$ century. Proton Exchange Membrane Fuel Cell (PEMFC) has emerged as the most promising power source for a broad range of applications including automotive power, mobile power, and small power plant. In the past ten years, PEMFC has drawn much attention, but there are still many difficulties in its commercialization procedure. In order to maintain a well proton conductivity of the membrane, the reactant gases are usually humidified during the fuel cell operations since PEMFC uses polymer solid polymer as proton conductor and good proton conduct process will be obtained if an operation of the solid polymer is in hydration status only.

Fuel cell performances are usually characterized by its polarization behavior through I-V curve, both of the steady and the transient state will be considered in its performance. In the application of the fuel cell, non-steady or transient operations are inevitable, such as the startup and shutdown of the cell, temperature change and load change or fluctuation of reaction gas. It arises a new problem that whether these transient responses of fuel cell can satisfy the commercial applications. In the last few years, the transient behavior of the PEMFC has already drawn more and more scientists' attentions. The related documents are: S. Kim, S. Shimpalee, J. W. V Zee, *J. Power Sources*, 135, 110 (2004); S. Yerramalla, A. Davari, A. feliachi, T. Biswas, *J. Power Sources*, 124, 104 (2003).

However, in order to simplify the system designation and optimize the operating conditions, researchers have been aiming at operating the fuel cell with unhumidified gases goal. The related articles are F. N. Buchi, S. Srinivasan, *J. Electrochem. Soc.*, 144, 2767 (1997) Z. Qi, A. Kaufman, *J. Power Sources*, 109, 469 (2002); TH. Yang, Y G Yoon, C. S. Kim, S. H. Kwask, K. H. Yoon, *J. Power Sources*, 106, 328 (2002); S. H. Kwak, T H. Yang, C. S. Kim, K. H. Yoon, J. Power Sources, 118, 200 (2003); M. V Williams, H. R. Kunz, J. M. Fenton, *J. Power Sources*, 135, 122 (2004); R. Eckl, W. Zehtner, C. Leu, U. Wagner, *J. Power Sources*, 138, 137 (2004). But no successful examples with effective methods to avoid membrane dehydration and the fuel cells flooding have been reported among these papers.

In researches on dynamic behavior of the fuel cells, J. Hamelin et. al (J. Hamelin, K. Agbossou, A. Laperriere, F. Laurencelle, T. K. Bose, *Int. J. Hydrogen Energy*, 26, 625 (2001)) found out the polarization hysteresis of an MK5 fuel cell stack. Load change (positive or negative) was controlled within every 0.15 s and with humidified gases. The results showed that the performance of negative load changes was always better than the positive ones. Then this phenomena was explained as a relationship of the membrane hydration level and the proton conductivity. During the positive load change, generated water needs time to distribute in the fuel cell which results a worse performance, and it is just the opposite effect for the negative load change. When the load decreases, as water in the membrane supports the proton conduct, the corresponding performance (I-V) curve shows better performance, which is called hysteresis.

J. R. Atkins et. al (J. R. Atkins, S. C. Savett, S. E. Creager, *J. Power Sources*, 128, 201 (2004)) explored the performance response when the membrane dehydrates. They found that the cell current and the high frequency resistance shows periodical fluctuation as the relative humidity of the reactant gases decrease. They explained this by the periodical dehydration and hydration of the membrane. S. Kim et. al (S. Kim, S. Shimpalee, J. W. V. Zee, *J. Power Sources*, 137, 43 (2004)) also investigated the transient behavior of the PEMFC with the humidified gases by fixed flow rates.

Actually, the electrical interface of the fuel cell is unfixed during the transient operation. K. Kanamura et. al (K. Kanamura, H. Morikawa, T Umegaki, *J. Electrochem. Soc.*, 150, A193 (2003)) found that the hydrophilic/hydrophobic interface between Pt electrode and Nafion membrane in HClO$_4$ solution is very easy to drift as the change of the relative humidity.

Simulation results also show that the reactant interface drifts as the operating condition change. The related articles are: C. Ziegler, H. M. Yu, J. O. Schumacher, 3$^{rd}$ *European Polymer Electrolyte Fuel Cell Forum*, B064-098, Luceme, Switzerland, (2005); C. Ziegler, H. M. Yu, J. O. Schumacher, *J. Electrochem. Soc.*, 152, A1555 (2005).

SUMMARY OF THE INVENTION

In order to overcome shortages in prior art, this invention aims to provide the method of selecting non-humidification operation condition of proton exchange membrane fuel cell to avoid both the membrane dehydration and fuel cell flooding.

The technical programs of this invention include: measuring the transient response of the current-voltage curve by the fixed temperature, flow rates and pressures with unhumidified gases, selecting the operating point for the dry gases and fulfill the goal of operating fuel under non-humidification steady operation condition.

The detailed procedure is as follows:

1. Measuring the transient I-V characteristics for the given operating temperature, pressure and flow rates of the dry gases:

(1) fuel cell(s) connecting to a test station are controlled by using a linear sweep method with galvanostatic (or potentiostatic), keeping the cell discharge from a electrochemical polarization zone to a diffusion polarization zone, and then sweeping back when it reaches setting value.

Wherein, settings of sweeping procedure: to set start and stop point, sweep rate firstly, then sweeping process is controlled by the software programs.

(2) To gather the transient current and voltage data online by controlling sampling interval between 10-100 ms until the sweep is stopped.

(3) To plot transient I-V curves.

Wherein, the operating conditions online are: ambient pressure, 30° C.-40° C., flow rates for the anode and cathode gas are 25 ml-400 ml/min and 50 ml-500 ml/min respectively.

2. Defining the operating point for dry gases operation (or threshold)

Based on the transient I-V curve, intersection of the forward sweep and the backward sweep is chosen as the dry gases operating point which is regarded as a steady operational point under the fuel cell operating conditions (including temperature, gas pressure and flow rate).

3. Starting the fuel cell by operating parameters (including temperature, gas pressure and flow rate, voltage and current) at the operating point, the cell can operate steadily and gain a steady power output.

Wherein, definition of the operating point is limited by the MEA materials, operating temperature, pressure and flow rates.

The advantage of this invention is:

1. This invention gathers the transient property of I-V curve under the dry operating condition, and obtains the best operating point for the fuel cell start and run condition according to the time hysteresis. It achieves the fuel cell operation steadily under the unhumidified conditions and gains a steady power output.

2. The selection method of this invention can realize the steady operation of the cell under non-humidification condition and avoid the dehydration problem of the membrane under the dry gases as well as the "flood" phenomena. The present invention can be applied to not only normal temperature work condition, but also the start and run of the fuel cell under zero degree temperature condition especially. It can simplify the system of the fuel cell (common fuel cells have generally equipped humidified device) and therefore improve the development of the fuel cell.

3. The method of selecting non-humidification operation condition of proton exchange membrane fuel cell in this present invention may be applied to automobile engine resulting in parts reduction for a system (common fuel cells have generally equipped humidified device). As for the fuel cell electric vehicles, this invention can simplify the system designation and reduce the cost, which is important to the real commercialization of the PEMFC.

DESCRIPTION OF THE INVENTION IN DETAIL

EXAMPLE 1

1. Measuring the transient I-V curves, the data is recorded as the basic principle to select the operating point (threshold).

Given operating conditions: cell temperature is 30° C., ambient pressure, dry gases flow rates for the anode and cathode are 400 ml/min and 200 ml/min respectively.

(1) The cell with Gore 5510 (25 μm) and Toray carbon paper are used as the GDL by hot press and form a MEA. Connect the cell with the test station and control the cell using the linear sweep method. The voltage (or current) sweep is controlled to sweep from the electrochemical polarization zone to the diffusion polarization zone (ranged from open-circuit voltage to 0.05V, then sweep back when it reaches the set value (repeat it at least 5 times generally).

The sweeping settings: first set the start and stop voltage (or current), and flow rates, then control the cell to sweep by the programmed software.

(2) To collect the transient response of cell voltage and current, monitoring the cell by a sampling interval at least 100 ms until the sweep stops.

Figure 2:
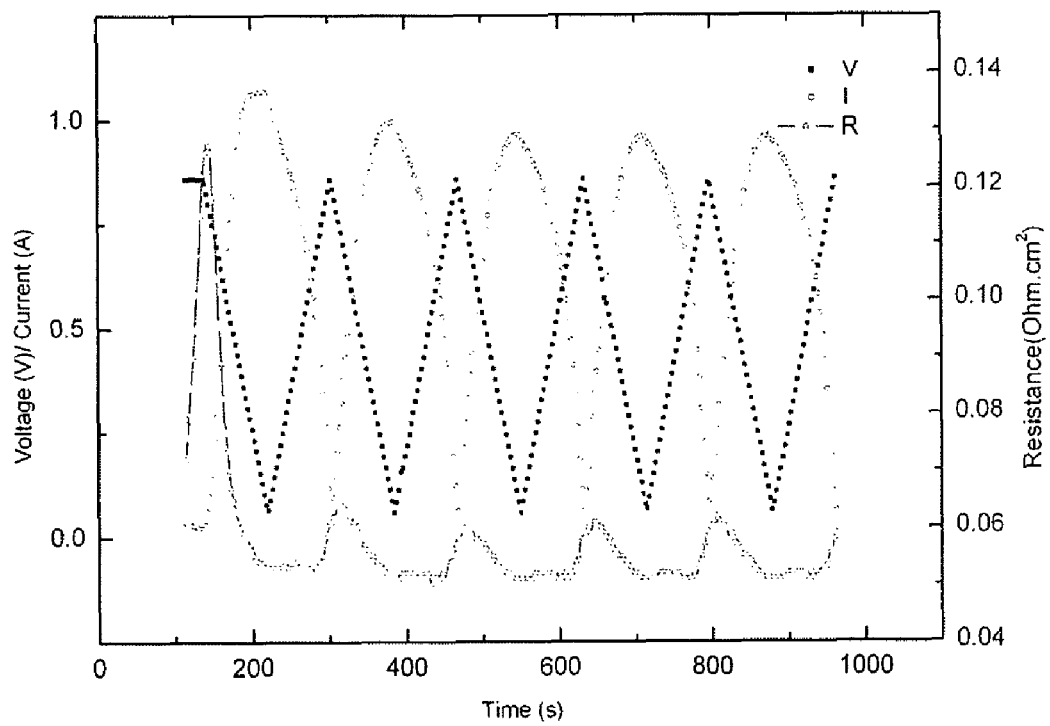
FIG. 2 is the transient response of cell current and voltage.

The transient performance of cell current, voltage and the MEA resistance at 10 kHz is shown in FIG. 2. HFR hysteresis phenomena has been observed. For the forward sweep (in the first cycle), the MEA resistance shows a high value due to the dehydration effect. For the backward sweep, the HFR falls back and keeps a dynamic balance.

Figure 3:
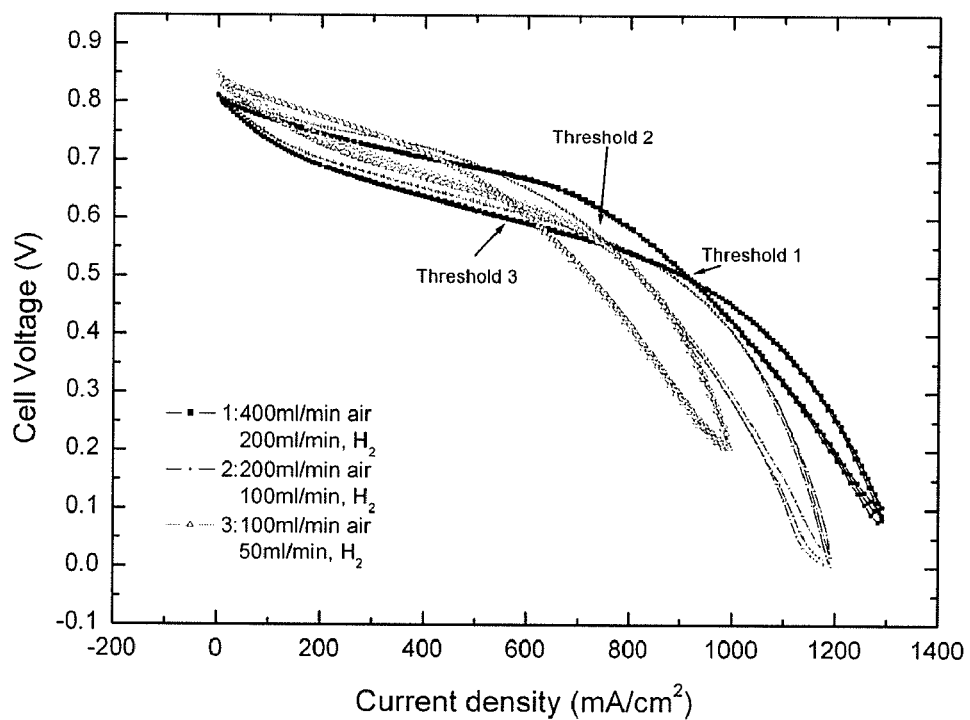
FIG. 3 is the illustration of "threshold" under different flow rates.

(3) To plot the transient I-V curve (see FIG. 3);

2. Choosing the operating point for dry gas operation (or threshold)

From the transient I-V curve, the operating point is obtained which is located just at the intersection of this two curves, the forward sweep and the backward sweep, the cell can operates steadily under the given dry operating condition (including temperature, gas pressure and flow rate and voltage and circuit).

Figure 1:
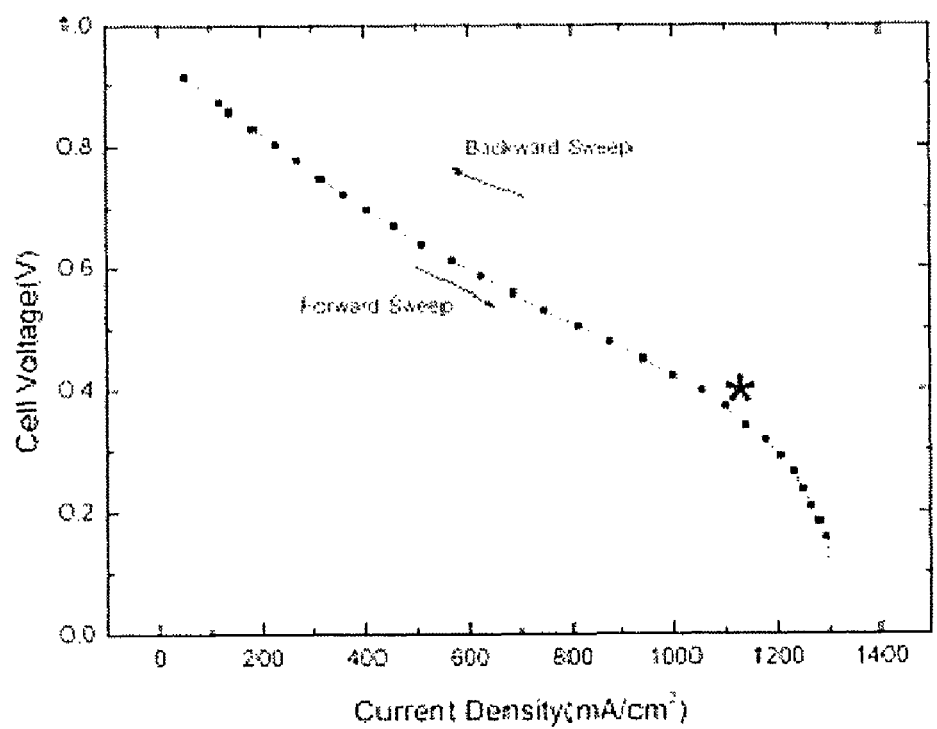
FIG. 1 is the illustration of the balanced point (threshold or operating point) by the linear sweep method.

In FIG. 1, the forward sweep is indicated by dark squares and the backward sweep is indicated by blank circles. The intersection is labeled as a star. During the forward sweep, the drying out effect of the MEA is the dominant factor before the threshold current density. After the threshold the water generated makes the membrane fully humidified and even flooding occurs.

3. The cell is operated under the above operating point and operating condition: the cell temperature is 30° C., ambient pressure, flow rates for the anode (with dry air) and cathode (with dry hydrogen) are 400 ml/min and 200 ml/min respectively, and 0.5V, 900 mA/cm$^2$. The operating point can be obtained under the conditions from the transient I-V curve under different flow rates.

4. The cell operated under the operating point and steady power output is obtained.

FIG. 3 shows the balance point, at which a stable power output obtained. Thus, the current and MEA resistance can remain at a relatively stable state by operating the cell with the galvanostatic under the dry gases condition near the balance region.

EXAMPLE 2

Compared with Example 1, Example 2 is done with exception of:

Measuring the Transient I-V Curves:

The cell with Gore 5510 (25 μm) and Toray carbon paper, GDL, is measured at temperature is 30° C. ambient pressure, flow rates for the anode (with dry air) and cathode (with dry hydrogen) are 200 ml/min and 100 min respectively. The transient I-V curve is recorded as the basic principle to select the operating point (see FIG. 3).

From FIG. 3, it can be seen that the operating point for the flow rate (200 ml/min, 100 ml/min) is 0.57V with current of 743 mA/cm$^2$.

EXAMPLE 3

Compared with Example 1, Example 3 is done with exception of:

Measuring the Transient I-V Curves:

The cell with Gore 5510 (25 μm) and Toray carbon paper, GDL, is measured at temperature is 30° C. ambient pressure, flow rates for the anode (with dry air) and cathode (with dry hydrogen) are 100 ml/min and 50 ml/min respectively. The transient I-V curve is recorded as the basic principle to select the operating point (see FIG. 3).

From FIG. 3, it can be seen that the operating point for the flow rate of the anode(with dry air) and cathode (with dry hydrogen) being (100 ml/min and 50 ml/min) is 0.61V and 583 mA/cm$^2$.

Figure 4:
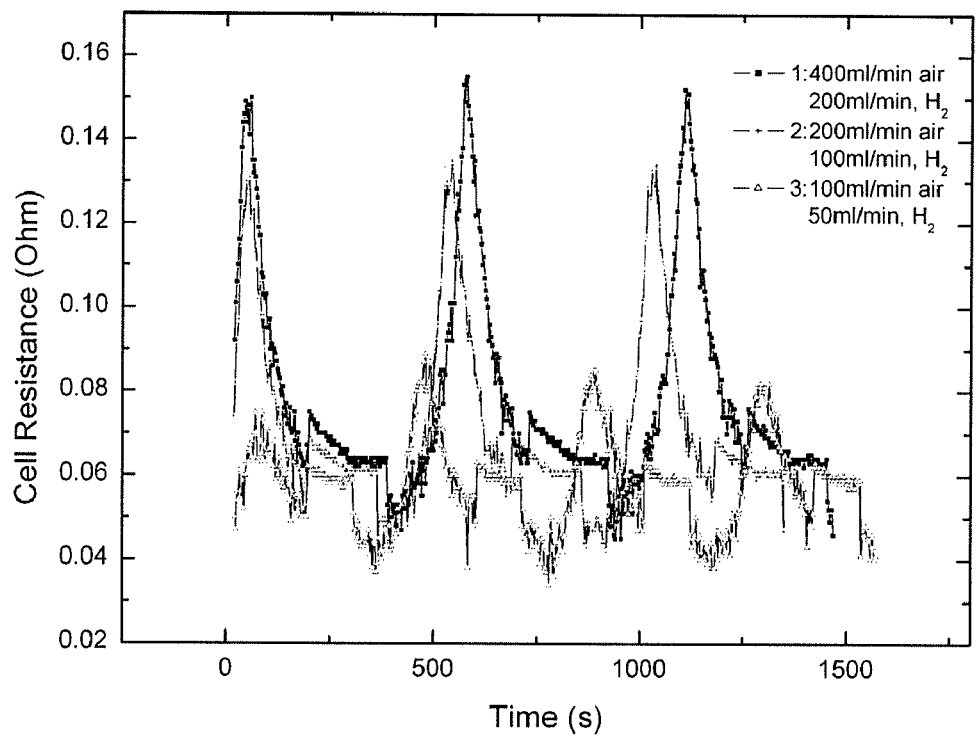
FIG. 4 is the illustration of the transient response of the high frequency resistance (HFR) under different flow rates.

It indicates that the current density at the operating point arises as the flow rates increases, and results in a higher high frequency resistance referring to FIG. 4. The higher the current density at the operating point, the more difficult the flooding happens.

EXAMPLE 4

Compared with Example 1, Example 4 is done with exception of:

Measuring the Transient I-V Curves Under Different Temperatures:

The cell with Gore 5510 (25 μm) and Toray carbon paper, GDL, is measured at temperature is 30° C. ambient pressure, flow rates for the anode (with dry air) and cathode (with dry hydrogen) are 50 ml/min and 25 ml/min respectively. The transient I-V curve at 30° C. is recorded as the basic principle to select the operating point (see FIG. 5).

Figure 5:
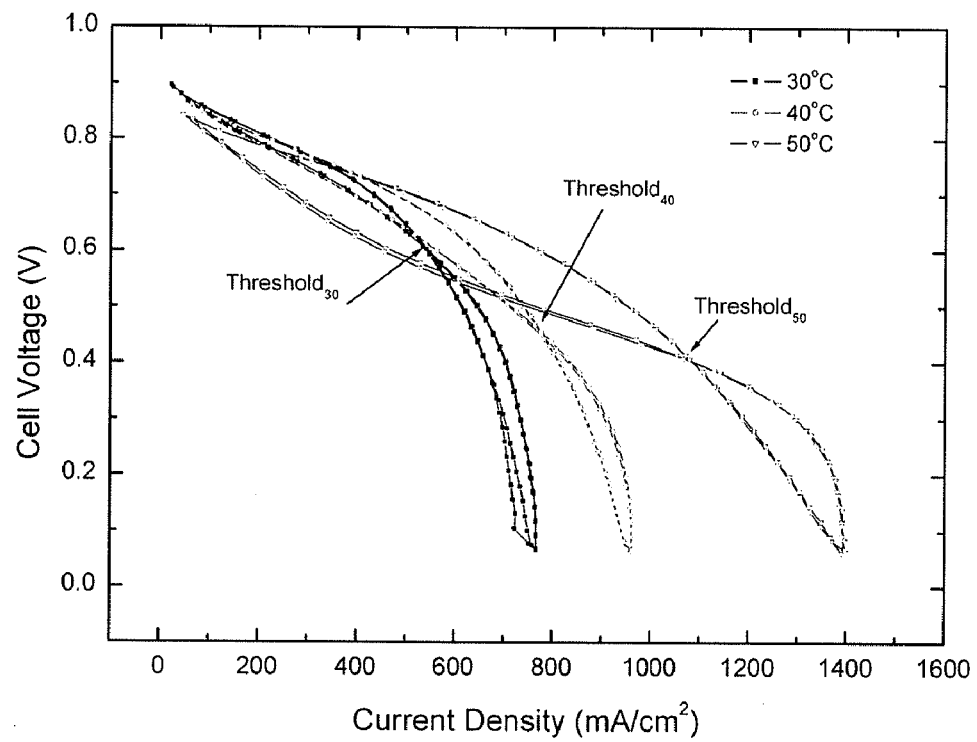
FIG. 5 is the illustration of "threshold" under different temperatures

From FIG. 5, it can be seen that the voltage is 0.605V with the operating point at 30° C. (Threshold$_{30}$) and the current is 537 mA/cm$^2$.

EXAMPLE 5

Compared with Example 1, Example 5 is done with exception of:

Measuring the Transient I-V Curves Under Different Temperatures:

The cell with Gore 5510 (25 μm) and Toray carbon paper as the GDL is measured at temperature is 40° C. ambient pressure, flow rates for the anode (with dry air) and cathode (with dry hydrogen) are 50 ml/min and 25 ml/min respectively. The transient I-V curve is recorded as the basic principle to select the operating point (see FIG. 5).

From FIG. 5, it can be seen that the voltage is 0.453V with the operating point at 40° C. (Threshold$_{40}$) and the current is 778 mA/cm$^2$.

EXAMPLE 6

Compared with Example 1, Example 6 is done with exception of:

Measuring the Transient I-V Curves Under Different Temperatures:

The cell with Gore 5510 (25 μm) and Toray carbon paper, GDL, is measured at temperature is 50° C., ambient pressure, flow rates for the anode (with dry air) and cathode (with dry hydrogen) are 50 ml/min and 25 ml/min respectively. The transient I-V curve is recorded as the basic principle to select the operating point (see FIG. 5).

From FIG. 5, it can be seen that the voltage is 0.409V with the operating point at 50° C. (Threshold$_{50}$) and the current is 1072 mA/cm$^2$.

FIG. 5 shows that the operating point at 30° C. (537 mA/cm$^2$, 0.605V) has the lowest current density due to the slow electrochemical reaction rate compared with the operating point at 40° C. (1072 mA/cm$^2$, 0.409V) and the operating point at 50° C. (1072 mA/cm$^2$, 0.409V). The slow electrochemical reaction rate results in a slow water generation rate, the I-V curve also shows the relatively weak dehydration effect.

EXAMPLE 7

Compared with Example 1, Example 7 is done with exception of:

Measuring the Transient I-V Curves Under Different Temperatures:

The cell with Gore 5510 (25 μm) and Toray carbon paper, GDL, is measured at temperature is 50° C., ambient pressure, flow rates for the anode (with air) and cathode (with hydrogen) are 50 ml/min and 25 ml/min respectively. The transient I-V curve is recorded as the basic principle to select the operating point (see FIG. 6).

Figure 6:
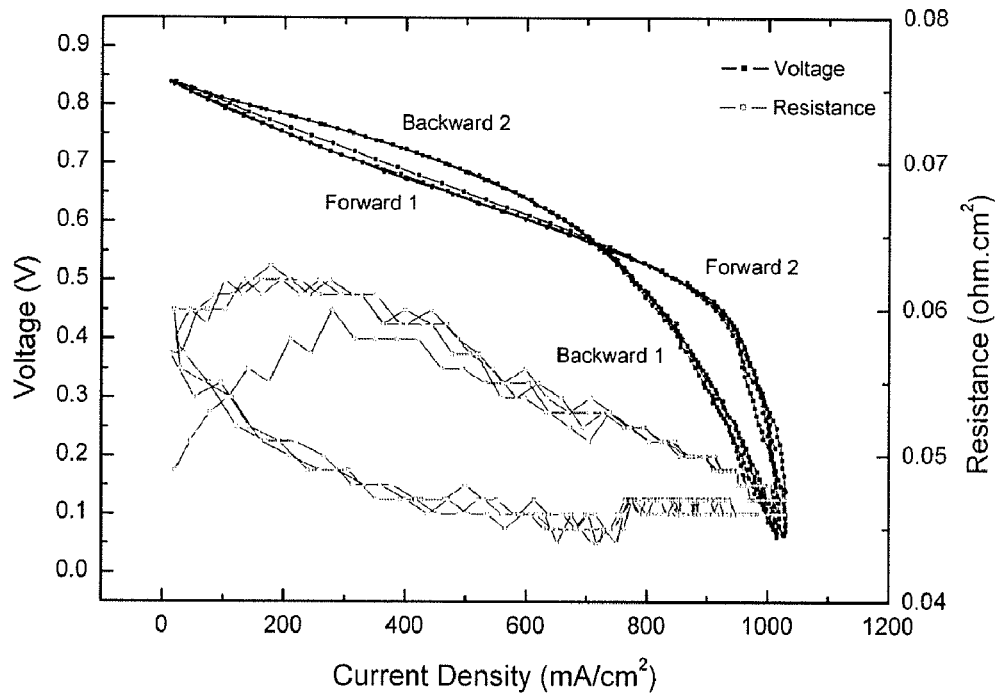
FIG. 6 is the illustration of the definition of "threshold"
Figure 7:
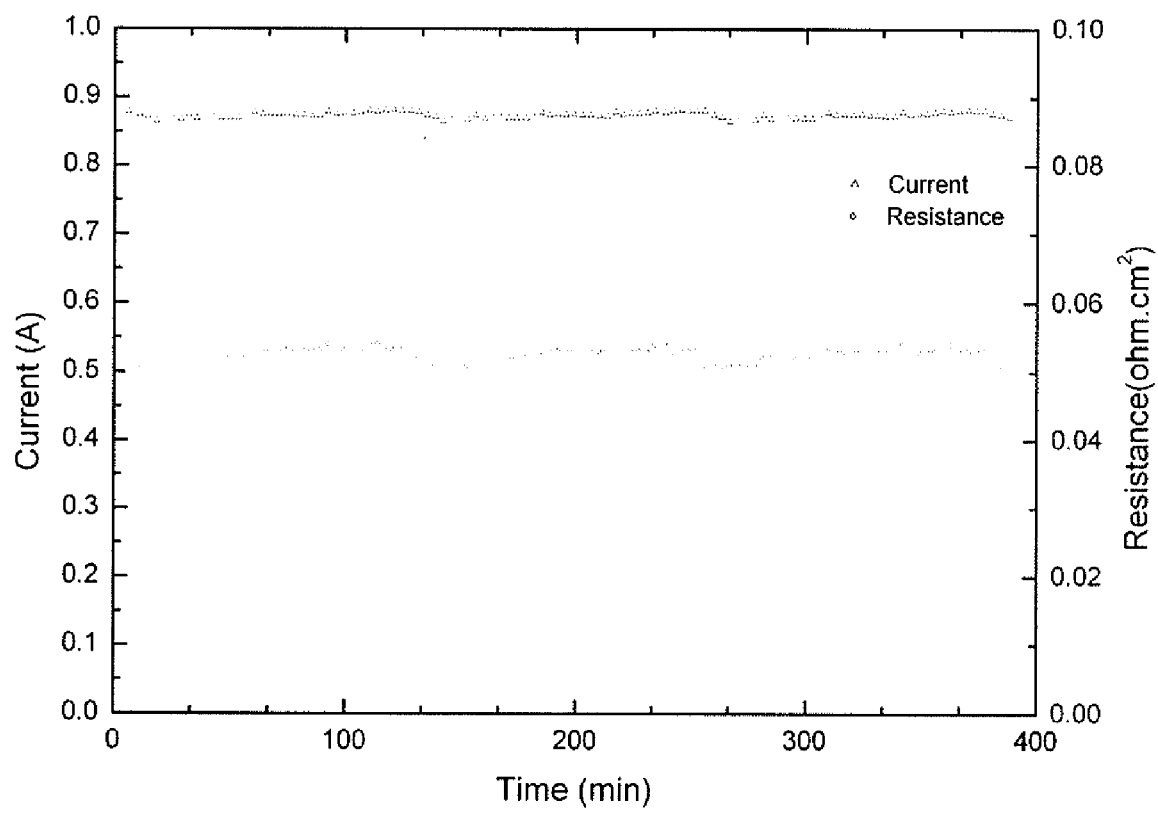
FIG. 7 is the stable operating curve under the operating point.

FIG. 6 shows that the voltage is 0.55V with the operating point at 50° C. (Threshold$_{50}$) and the current is 712 mA/cm$^2$. So far, a steady power output is obtained under this operating point (see FIG. 7). The current and MEA resistance can remain at a relatively stable state by operating the cell at the galvanostatic under the dry gases condition near the balance region.

What is claimed:

1. A method of selecting non-humidification operation condition of proton exchange membrane fuel cell, characterized in that transient current-voltage curves are measured when dry gases are fed in; the intersection point of the forward sweep and the backward sweep is selected as the operating point, which makes the fuel cell operates at dry conditions steadily.

2. The method of selecting non-humidification operation condition of proton exchange membrane fuel cell, according to the claim 1, characterized in that the procedure is as follows:
   1) measuring the transient current-voltage curve of the fuel cell under condition of given temperature, gas pressure and dry gas flow rates:
      implementing sweep by using a linear scan method from a activation polarization zone to a diffusion polarization zone, until get the identical curve;
   2) gathering the transient current and voltage data online for plotting the transient current-voltage;
   3) locating the operating or equivalent point which is the intersection point of the forward and backward sweep under the fuel cell dry operation;
   4) starting up the fuel cell at the hereinabove operating operation point by using potentiostatic or galvanostatic for gaining a steady power output as non-humidification operation condition.

3. The method of selecting non-humidification operation condition of proton exchange membrane fuel cell, according to the claim 2, characterized in that gathering the transient current and voltage data online by controlling sampling interval between 10 ms to 100 ms.

* * * * *